United States Patent [19]

Wade et al.

[11] 4,214,457

[45] Jul. 29, 1980

[54] FLEXIBLE COUPLING APPARATUS

[75] Inventors: James Wade, Stratford; Charles S. Jewett, Lyme, both of Conn.

[73] Assignee: Avco Corporation, Stratford, Conn.

[21] Appl. No.: 31,047

[22] Filed: Apr. 18, 1979

[51] Int. Cl.³ ............................................. F16D 3/78
[52] U.S. Cl. .......................................... 64/4; 64/13; 64/11 F; 64/1 C; 403/335; 403/349; 403/286; 123/198 R
[58] Field of Search ................. 64/13, 11 F, 10, 11 R, 64/15 B, 6, 4, 32 R, 1 R, 1 C; 403/335, 336, 337, 349, 286; 73/134; 123/198 R

[56] References Cited

U.S. PATENT DOCUMENTS

| 1,790,285 | 1/1931 | Spase | 64/13 |
|---|---|---|---|
| 2,712,741 | 7/1955 | Roller | 64/13 |
| 3,500,658 | 3/1970 | Goody | 64/13 |
| 3,703,817 | 11/1972 | Orwin | 64/13 |
| 4,023,405 | 5/1977 | Larson | 73/134 |
| 4,055,966 | 11/1977 | Fredericks | 64/13 |
| 4,096,711 | 6/1978 | Carlson et al. | 64/13 |

Primary Examiner—Ira S. Lazarus
Assistant Examiner—Magdalen Moy
Attorney, Agent, or Firm—Ralph D. Gelling

[57] ABSTRACT

A flexible coupling shaft which is suitable for plug-in installation between the splined output shaft of a turbine engine and the splined input shaft of a testing apparatus for the production test of the engine, includes a shaft member having opposed end flanges which are connected by: (1) bayonet connections to hub members, each having a splined central portion for receiving the splined shaft of either the engine or the testing device; and (2) flexible joint connections in the form of stacked arrays of flat metallic shims, with the stacked shims being separately connected respectively to the flange parts of the shaft and the associated hub. By this arrangement, axial misalignment between the splined input and output shafts is compensated by the splined interconnections, while lateral misalignments are compensated for by bending of the stacked shims which define a diaphragm-type coupling. Upon removal of either the engine shaft or the shaft of the testing apparatus, the respective bayonet connection supports the cantilevered shaft member of the flexible coupling apparatus, thereby precluding overstressing of the stacked shims.

12 Claims, 5 Drawing Figures

FLEXIBLE COUPLING APPARATUS

The subject invention relates to a flexible coupling shaft suitable for plug-in installation between the splined shaft extending from a power producing device, such as a turbine engine, and the splined shaft extending from a power absorbing device, for example a waterbrake dynamometer, during testing of the turbine engine.

In the manufacture of mass produced engines, it is required that the final testing be conducted at 100% operating conditions to ensure meeting performance specifications of the turbine engine, and it is desirable that the testing procedure be carried out as quickly as possible, with a minimum amount of time in setting up of the test installation.

Heretofore, in order to interconnect the splined shafts extending from a turbine engine and a power absorbing testing device, conventional coupling shafts have been employed. However, it has been found that the commercially available coupling shafts have one or more of the following disadvantages. In the case of diaphragm type coupling shafts, although such couplings can accommodate moderate misalignment (both lateral and angular) between the splined shafts extending from the turbine engine and the power absorbing device, such conventional couplings do not accept spacing errors i.e., variation in the distance between two devices. Thus, such prior art couplings require time consuming checking and bolting for each test installation. This is undesirable as competitive pressures make it mandatory to be able to install, remove and re-install power producers and/or power absorbers in minutes, rather than in hours. Another disadvantage of diaphragm couplings is brought about when either the engine or dynamometer is disconnected from the coupling, such that the coupling shaft is simply cantilevered from the assembly thereby imposing relatively high stresses on the diaphragm connections, thus possibly giving rise to overstressing of the coupling elements.

Another form of coupling is a simple spline shaft of the prior art type which can be plugged in at installation, and can accept spacing errors brought about as a result of accumulated manufacturing tolerances and/or movement resulting from temperature or pressure within the tested devices. However, simple spline shafts of the prior art type have the limitation that they can only accept limited alignment errors in the plane lateral to the longitudinal axis of the splined shafts.

Accordingly, it is an object of the subject invention to provide a new and improved flexible coupling shaft suitable for plug-in installation between a power producing device such as a turbine engine, and a power absorbing device, such as a water-brake dynamometer.

It is a further object to provide a flexible coupling shaft which may be quickly connected and quickly disconnected, whereby it is adapted for use in the production tests of high quality engines wherein each mass produced engine is finally tested at 100% operating conditions to insure meeting performance specifications.

It is still a further object of the subject invention to provide a flexible coupling shaft having the desirable features of spline couplings and diaphragm couplings, whereby the invention provides the plug-in installation feature and allows for axial spacing errors, without the requirement for time-consuming measurements to be made at installation time, and without the requirement for bolting of the assemblies at the test installation. In addition, the subject flexible coupling shaft includes the features of a diaphragm coupling at opposite ends of the transmission shaft in order to provide for lateral, vertical, and angular misalignment between the shafts extending from the engine and the waterbrake dynamometer. After an initial alignment has been effected, no further measurements are required in the installation of the subject test apparatus as the driving or the driven machines are changed.

It is still a further object of the subject invention to provide means for limiting the axial deflection of the diaphragm coupling portion of the subject flexible coupling shaft when either the engine or the waterbrake dynamometer are removed, thereby precluding the flexible coupling means of the subject device from exceeding their allowable stress level.

The above objects and advantages are achieved by the new and improved flexible coupling apparatus which comprises a shaft member having flange parts on opposite ends thereof. Each flange is formed to define one portion of a bayonet connection, and is interconnected to a hub member by the bayonet connection. Each hub member has a central splined portion for receiving either the spline shaft extending from the engine or from the waterbrake dynamometer. Each flange part and its associated hub are also connected by a flexible joint consisting of a stacked plurality of annular, flat metallic shims having an array of spaced aligned holes in the circumference thereof. Separate fastening means respectively connect the stacked shims to the flange part of the shaft member, and to the hub. Axial misalignment between the splined shafts of the engine and the waterbrake dynamometer are essentially accommodated by the splined interconnection between the shafts, while lateral, vertical, and angular misalignment between the shafts of the engine and the waterbrake dynamometer are accommodated by bending of the stacked shims in the flexible joints between the hubs and the flange parts of the shaft.

Further objects, advantages, and features of the present invention will be fully understood from the following detailed description of a typical preferred form and application of the invention, throughout which description reference is made to the accompanying drawings, in which.

Figure 1:
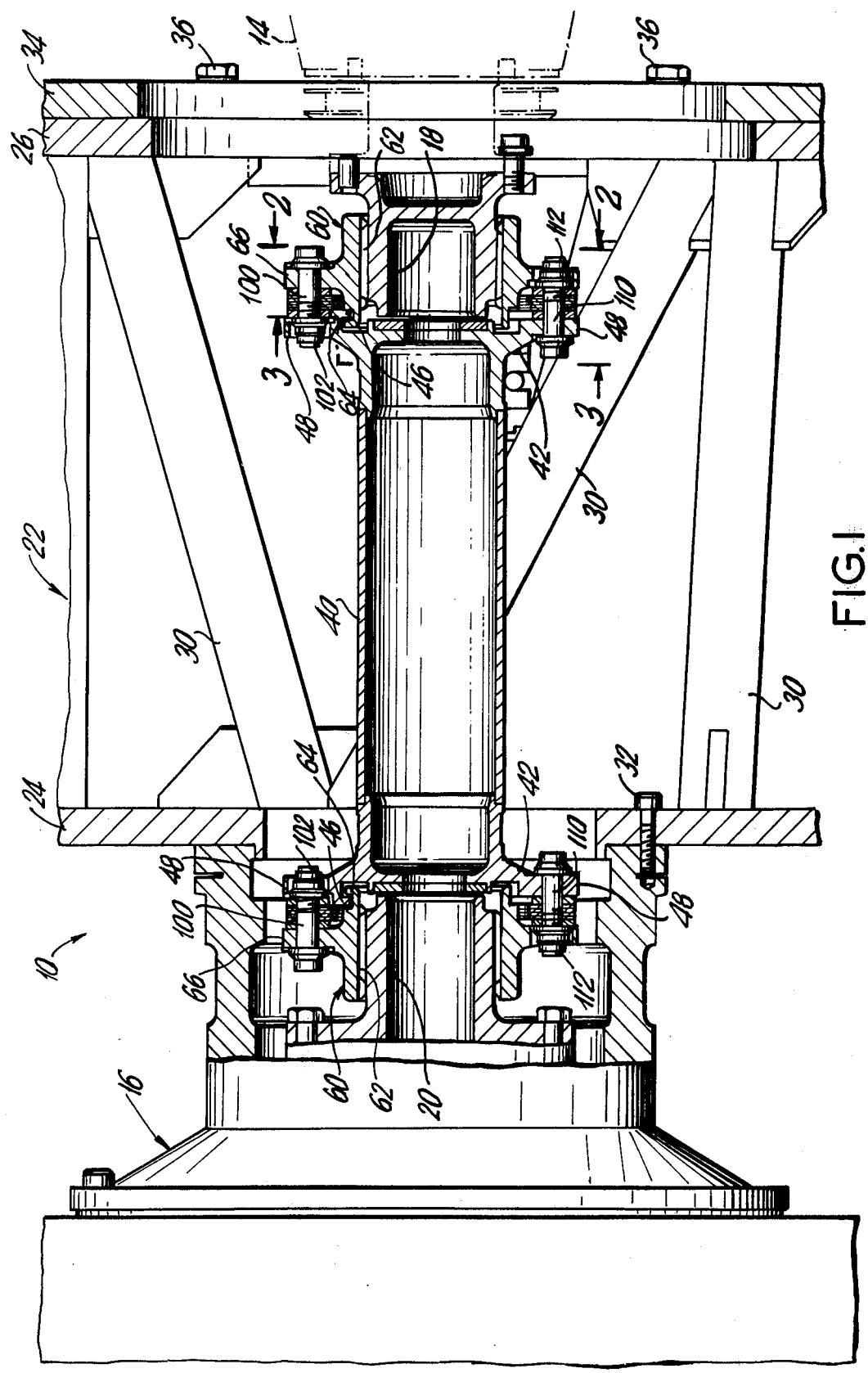
FIG. 1 is a partial sectional view illustrating the flexible coupling apparatus of the subject invention interconnecting an engine and a testing device.

Referring to FIG. 1, the subject flexible coupling apparatus is generally designated by the numeral 10 and is capable of effecting the plug-in installation between a power producing device, such as engine 14, and a power absorbing device, such as waterbrake dynamometer 16 for dynamic testing of the engine. More particularly, the flexible coupling apparatus 10 is designed to rapidly and readily engage the splined output shaft 18 extending from the engine 14, and to rapidly and readily engage, at the opposite end thereof, the splined input shaft 20 of the waterbrake dynamometer 16. The flexible coupling apparatus includes framework 22 including end plates 24 and 26 interconnected by tubes 30 extending along the length of the framework, with plate 24 being bolted, as by bolts 32 to the housing of the dynamometer 16. A plate 34 secured to the engine 14 is bolted as at 36 to plate 26 at the opposite end of the framework. By this arrangement, the axial spacing between the engine and the dynamometer 16 is maintained by the framework assembly 22.

In order to compensate for misalignments, both vertical and lateral, as well as angular misalignment, between the spline shafts 18 and 20 respectively extending from the engine 14 and dynamometer 16, the flexible coupling apparatus 10 includes a transmission shaft 40 having at its opposed ends flange parts 42, 42. As more clearly illustrated in FIGS. 3 and 4, each flange part includes a radially inwardly directed lip 44 which is machined out in three spaced locations to define the male part of a bayonet coupling 46. Each flange part 42 also includes a radially outwardly directed portion 48 having six spaced apertures therein, as designated by the numerals 50 and 52. Alternate apertures 52 are provided to accommodate fastening means for engagement of the flange part 42 with a flexible joint connection, as more fully described hereinafter, whereas alternate apertures 50 are of greater diameter than apertures 52 and allow other fastening means to completely extend through the portion 48, as more fully described hereinafter.

Figure 2:
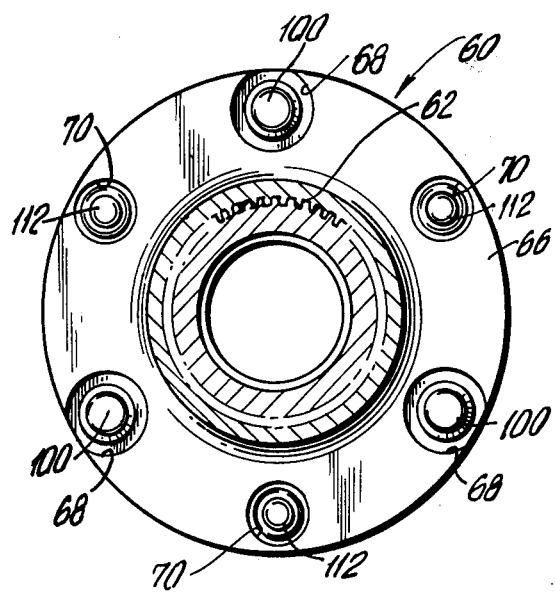
FIG. 2 is a sectional view taken along line 2—2 in FIG. 1.
Figure 3:
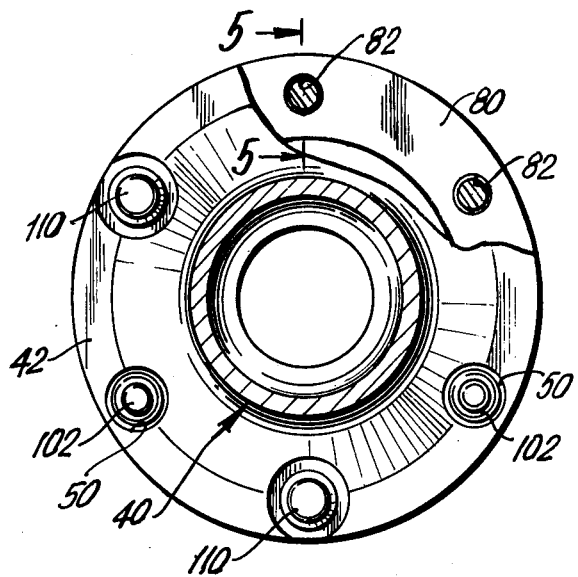
FIG. 3 is a sectional view taken along line 3—3 in FIG. 1.
Figure 4:
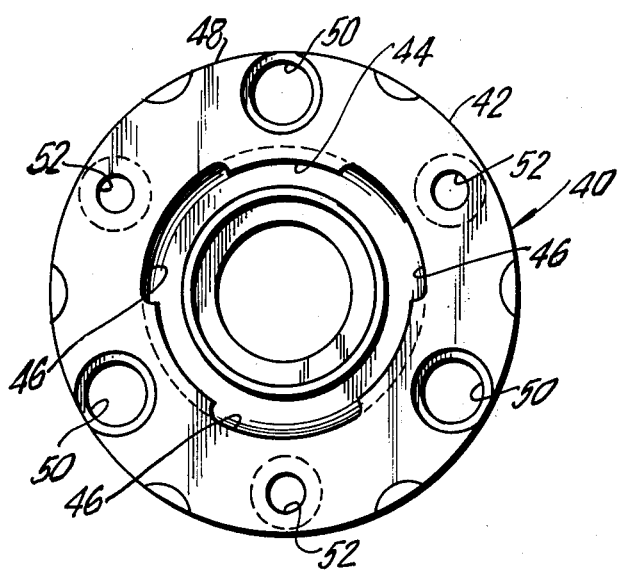
FIG. 4 is an elevational view of the flange part of the shaft forming a portion of the flexible coupling apparatus of the subject invention.
Figure 5:
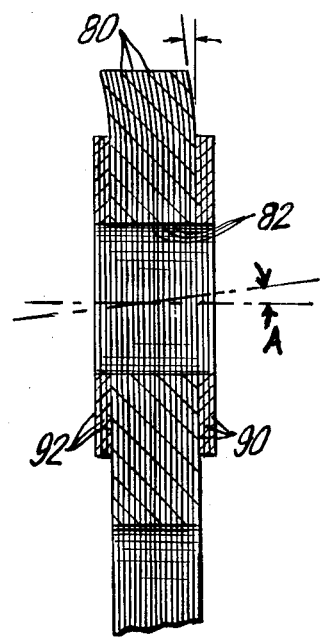
FIG. 5 is a sectional view taken along line 5—5 in FIG. 3.

A hub member 60 is provided at each end of the shaft 42 and includes a splined central portion 62 (see FIG. 2) for interconnection with either the spline shaft 18 of the engine or the spline shaft 20 of the waterbrake dynamometer. Each hub 60 also includes, as shown in FIG. 1, the female portion of a bayonet coupling 64 which engages the bayonet coupling 46 of the associated flange part 42 for interconnecting the flange part to the hub. In addition, each hub 60 includes a radially outwardly directed flange portion 66 having six spaced alternating apertures, designated by the numerals 68 and 70. Apertures 68 and 70 are aligned with apertures 50 and 52 of the flange part 42. Disposed between the respective outwardly directed portions of each flange part 42 and its associated hub 60 is a flexible joint connection in the form of a plurality of stacked, flat metallic shims 80 which are slidable relative to one another. As illustrated in FIGS. 3 and 5, each shim includes a circumferential array of apertures 82 which are aligned with the apertures 50-52 and 68-70. Each shim is preferably made of a thin stainless steel material, having a thickness on the order of 0.008 inches to 0.011 inches. Disposed on opposite sides of each aperture 82 of the stacked shims 80 are a plurality of washers 90 and 92. The stacked shims 80 are connected to the hub 60 by fastening means in the form of three spaced bolts 100 extending through apertures 68, with the nut portions 102 of bolts 100 being disposed in the enlarged openings 50 in the flange part 42 so as to insure no interconnection between the bolts 100 and the flange part 42. In like manner, the flange part 42 is connected to the stacked shims 80 by three spaced bolts 110 extending through apertures 52, with the nuts 112 associated with the bolts 110 passing through the enlarged openings 70 in the hub 60. Preferably, the diameters of the apertures 82 in the shims 80 correspond closely to the diameters of the shanks of bolts 100, 110. By this arrangement any vertical or lateral misalignment, as well as angular misalignment between the spline shafts 18 and 20 may be readily accommodated by the flexible connections consisting of the thin metal, stacked shims 80. As an example, as illustrated in FIG. 5, upon misalignment of the spline shafts 18 and 20, the three spaced bolts 100 will remain parallel to each other and perpendicular to the flange on hub 60. Likewise the three spaced bolts 110 will remain parallel to each other and perpendicular to flange 42. However, bolts 110 will be displaced from being parallel to bolts 100 by the angle A, as shown in FIG. 5. Since bolts 110 are also displaced tangentially from bolts 100, misalignment angle A is accommodated by bending of the thin metallic, stacked shims 80, as shown in FIG. 5. Since the stacked shims 80 are thin, and since the misalignment is usually limited, the bending stress in the shims is readily accommodated. It should be noted that the tension in bolts 100 and 110 is maintained at a sufficiently high value such that all the normal torque loads are carried entirely by friction between the stacked shims 80 and the flange structure. It is also noted that the sets of washers 90 and 92 function to spread the tension load of each bolt over a greater surface area of the stacked shims, and also function to limit the extent of bending of the stacked shims, thereby minimizing stress concentrations.

After the test installation has been completed, and during the testing operation, the torque output of the engine is transmitted through the hubs and shaft 40 via the relatively movable shims 80. When the testing operation is completed, it is merely necessary to unplug the engine 18, at which time the shaft 40 is cantilevered and is supported by virtue of the bayonet connection 46, 64 between the flange part 42 and hub 60 at the waterbrake dynamometer portion of the flexible coupling apparatus. Hence, the bayonet connection protects the shims 80 against excessive bending stress while the coupling shaft is being supported in the cantilevered position.

Accordingly, there is provided a new and improved flexible coupling assembly for effecting the plug-in installation between an engine and a power absorbing device. The splined coupling provided by the splined central portions 62 of the hubs 60 provide the plug-in installation feature of the invention, and is capable of accommodating spacing errors between the engine and the waterbrake dynamometer. Accordingly, no measurements have to be made at the time of installation and no bolts are required to be tightened, as heretofore required in conventional diaphragm type flexible coupling shafts. Furthermore, the two flexible couplings provided at opposite ends of the shaft 40 provide for lateral, vertical, and/or angular misalignments between the spline driving shaft 18 and the driven spline shaft 20. After an initial alignment, no further measurements are required as the engines are interchanged. To further provide for a trouble-free plug-in installation, the subject invention includes the feature of the flange parts supporting the hub being connected by a loose bayonet latch. The bayonet latch connection limits the axial deflection of the stacked shims to an allowable stress level. It has been found that minor axial dimension errors may be accepted by the stacked shims, however, when major errors exist, the bayonet latches in the flange parts and the hub will operate to limit the deflection of the stacked shims and force the spline couplings to accommodate the error. The bayonet latches further protect the stacked shims when either the engine 14 or waterbrake dynamometer 16 are removed. At such time the overhang moment created by the cantilevered shaft is carried by the bayonet latch, whereby such stress does not act on the thin shims 80 which could possibly cause overstressing of the shims and possible permanent deformation thereof.

While a specific embodiment of the present invention has been described it will be apparent to those skilled in the art that alterations, modifications and changes may be made in the construction of the subject invention without departing from the sprit and scope of the invention as defined by the appended claims.

What is claimed is:

1. Flexible coupling apparatus for interconnecting a splined shaft extending from an engine and a splined shaft extending from a testing device comprising:
   a shaft member having flange parts on opposite ends thereof, each flange being formed to define one portion of a bayonet connection;
   two hub members each formed to define a cooperating portion of a bayonet connection and respectively connected to the flange parts of said shaft member, each hub having a splined central portion for receiving the splined shaft extending from the engine or the testing device; and
   a flexible joint connecting each flange part to its associated hub whereby axial misalignment between the splined shaft of the engine and testing device are accommodated by the splined interconnections between said shafts and the hub members, while lateral misalignments between said shafts are compensated by the flexible joint connections.

2. Flexible coupling apparatus as in claim 1 further including a frame assembly connected at one end to said engine and an opposite end to the testing device for maintaining said engine and testing device in axial spaced relationship, with the shaft member being disposed within said frame assembly.

3. Flexible coupling apparatus as in claim 1 wherein each flexible joint connection comprises a plurality of stacked, angular, flat metallic shims having an array of aligned holes in the circumference thereof, and a first set of fastening means connecting said stacked shims to the flange part of the shaft member, and a second set of fastening means connecting said stacked shims to said hub member to enable movement of said shims upon lateral misalignment of the shafts.

4. Flexible coupling apparatus as in claim 3 wherein each shim is provided with six spaced openings, with each set of fastening means including three bolts.

5. Flexible coupling apparatus as in claim 3 wherein each shim is on the order of 0.008 inches to 0.011 inches thickness.

6. Flexible coupling apparatus interconnecting a splined shaft extending from an engine and a splined shaft extending from testing apparatus comprising:
   a frame assembly connected at one end to said engine and at its opposite end to the testing device for maintaining said engine and testing device in axial spaced relationship; and
   a shaft assembly including a shaft member having flange parts on opposite ends thereof, each flange part being formed to define one portion of a bayonet connection; two hub members each formed to define a cooperating portion of a bayonet connection and respectively connected to each flange part of said shaft member, each hub having a splined central portion for respectively receiving the splined shaft extending from either the engine or the testing device; and a flexible joint connecting each flange part to its associated hub, each flexible joint including a stacked plurality of annular, flat metallic shims having an array of spaced aligned holes in the circumference thereof, and fastening means respectively connecting said stacked shims to the flange part of the shaft member and separately connecting said stacked shims to said hub, whereby axial misalignment between the splined shafts of the engine and testing device are accommodated by the splined interconnections between said shafts and the shaft member, while lateral misalignment between said shafts are compensated by the flexible joint connections.

7. Flexible coupling apparatus as in claim 6 wherein each annular, flat metallic shim has a thickness on the order of 0.003 inches to 0.011 inches.

8. Flexible coupling apparatus as in claim 6 wherein the metallic shims include six spaced holes provided in the circumference thereof, with each fastening means extending between said stacked shims and the hubs or flange parts including three bolts.

9. Flexible coupling shaft apparatus for interconnecting two splined shaft comprising:
   a shaft member having opposed end flanges, each flange including an inwardly directed portion and an outwardly directed portion, said inwardly directing portion defining one part of a bayonet connection, while the outwardly directed flange portion includes a plurality of spaced, axially extending holes therein;
   two hub members, each including an inwardly directed portion defining a cooperating part of a bayonet connection for engagement with the inwardly directed flange of the shaft member, each said hub member further including an outwardly directed portion having a plurality of spaced, axially extending holes therein;
   two sets of relatively movable stacked shims disposed between each said flange and hub member, each set of shims having an array of holes in the circumference thereof in alignment with the holes provided in said outwardly directed portion of the flange and said outwardly directed portion of the hub; and
   fastening means for separately connecting each set of stacked shims to the outwardly directed portions of the associated hub and flange.

10. Flexible coupling shaft apparatus as in claim 9 wherein each shim is of annular, flat configuration.

11. Flexible coupling shaft apparatus as in claim 10 wherein each shim is of a thickness on the order of 0.008 inches to 0.011 inches.

12. Flexible coupling shaft apparatus as in claim 11 wherein six holes are provided in each set of shims, and said fastening means comprises three bolts interconnecting each set of stacked shims to the associated hub, and three bolts connecting each set of stacked shims to the associated flange.

* * * * *